United States Patent [19]

Ueda

[11] Patent Number: 4,849,617
[45] Date of Patent: Jul. 18, 1989

[54] SEMICONDUCTOR CARD WHICH CAN BE FOLDED
[75] Inventor: Tetsuya Ueda, Itami, Japan
[73] Assignee: Mitsubishi Denki Kabushiki Kaisha, Tokyo, Japan
[21] Appl. No.: 26,967
[22] Filed: Mar. 17, 1987
[30] Foreign Application Priority Data
Mar. 17, 1986 [JP] Japan .................... 61-60250
[51] Int. Cl.⁴ .............................. H05K 1/18
[52] U.S. Cl. ..................... 235/492; 235/487; 361/398; 361/414
[58] Field of Search ............... 235/487, 488, 489, 490, 235/491, 492, 493, 494, 495; 361/398, 414
[56] References Cited
U.S. PATENT DOCUMENTS
4,104,728 8/1978 Kasubichi .................... 235/398
4,417,413 11/1983 Hoppe et al. ................. 235/488
4,450,024 5/1984 Haghiri-Tehrani ............. 156/108
4,463,971 8/1984 Hoppe et al. ................. 235/488
4,617,216 10/1986 Haghiri-Tehrani ............. 235/488
4,677,528 6/1987 Miniet ........................ 235/492
4,682,017 7/1987 Nakahara et al. .............. 235/492

FOREIGN PATENT DOCUMENTS
59-228743 12/1984 Japan .

Primary Examiner—A. D. Pellinen
Assistant Examiner—Jeffrey A. Gaffin
Attorney, Agent, or Firm—Saidman, Sterne, Kessler & Goldstein

[57] ABSTRACT

A thin semiconductor card, such as an IC card, includes a card main body, and a semiconductor module mounted therein. A foldable part or member is provided permitting the card main body to be folded.

6 Claims, 4 Drawing Sheets

SEMICONDUCTOR CARD WHICH CAN BE FOLDED

BACKGROUND OF THE INVENTION

The present invention relates to thin semiconductor cards incorporating semiconductor devices, such as IC cards, and specifically to the structure of the card.

Such cards have a variety of configurations. The configuration discussed below is that of a prior art IC card with built-in semiconductor module.

Plan and side views of such an IC card are shown in FIG. 4 at (a) and (b). The components are the semiconductor module 1 and the card main body 2. Electrical communication with external devices is performed through a number of electrode contacts 7 mounted on the surface of the semiconductor module.

When information is written into or read from such an IC card, the card must be inserted into an external device, which communicates with the card main body through the electrode contacts 7.

The dimensions and external configuration of the most widely-used IC cards have been standardized. When such cards are attached to clothing etc. for use as personal identification (ID cards), their large size is an inconvenience, and exposure of the contact surfaces may cause destruction of internal circuit elements because of the static charges.

SUMMARY OF THE INVENTION

An object of the present invention is to provide a thin semiconductor card that is convenient to carry and that affords protection from static destruction.

According to the invention, deformable hinging means are provided so that the card can be folded. Folding the card simplifies carrying, and in the folded position the contacts cannot be touched by people and objects bearing static charges, so the internal semiconductor components are protected from static destruction.

DETAILED DESCRIPTION OF THE PREFERRED EMBODIMENTS

Figure 1A:
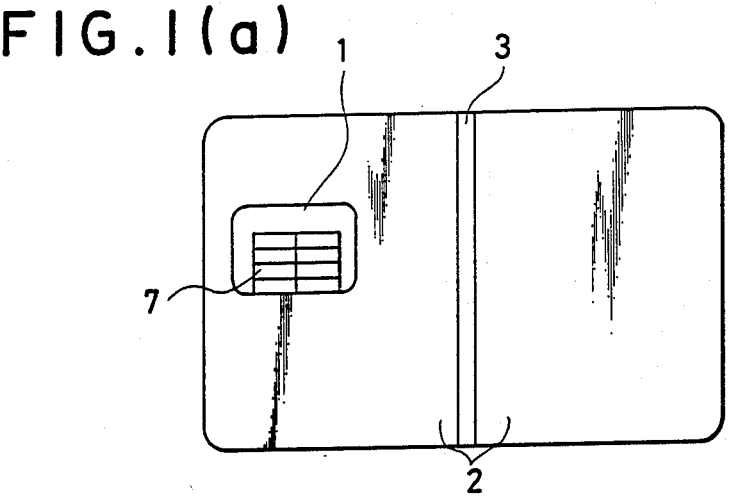
FIGS. 1(a) and 1(b) are a plan view and a side view showing a thin semiconductor card of an embodiment of the invention.
Figure 1B:
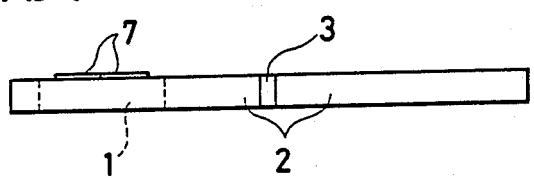
Figure 1C:
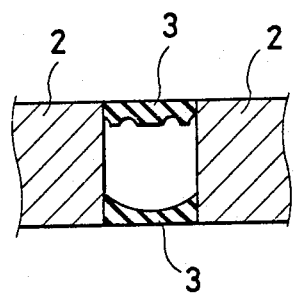
FIG. 1(c) is an enlarged sectional view of the deformable part of the semiconductor card as unfolded.

The embodiment of the present invention are described below with reference to the drawings. The IC card embodying the invention depicted in FIG. 1 comprises a card main body 2 and a semiconductor module 1. The card main body 2 is divided into two sections connected by the deformable hinging part 3. As shown in FIG. 1 (c), the deformable hinging part comprises expandable polymer rubber bridges linking the two sections of the card. In the unfolded position shown in FIG. 1, the card conforms to international standards regarding card dimensions.

When the above-described IC card is used with an external read/write device, it is unfolded as in FIG. 1 so that it assumes the standard dimensions. It can then be inserted in the external device for exchange of information.

Figure 2A:
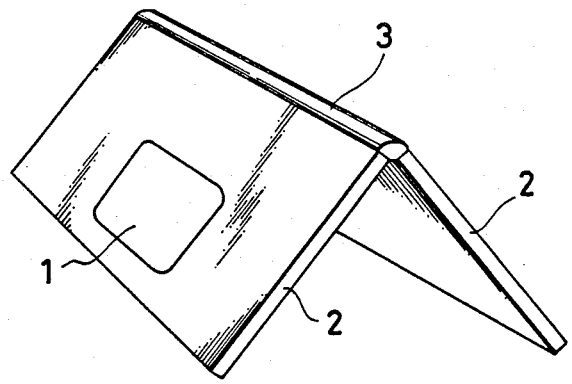
FIG. 2(a) is a perspective view showing the thin semiconductor card of FIG. 1 in the process of being folded.
Figure 2B:
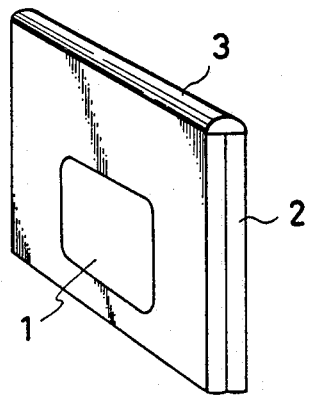
FIG. 2(b) is a perspective view showing the thin semiconductor card of FIG. 1 as folded.
Figure 2C:
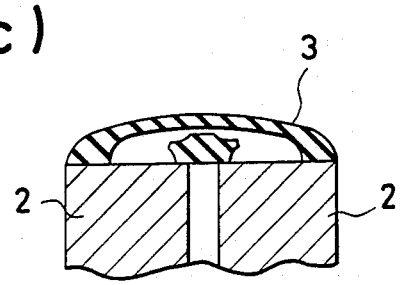
FIG. 2(c) is an enlarged sectional view of the deformable part of the semiconductor card as folded.

When the card is carried, it is folded at the deformable hinging parts as shown in FIG. 2 (a) and carried in the closed state depicted in FIG. 2 (b). The detailed view in FIG. 2 (c) shows the configuration of the deformable hinging part in the closed state.

When folded shut, the card of this embodiment is convenient to carry, yet it can be used with no hindrance with existing external devices because it unfolds to the standard dimensions. In the folded state, the contacts 7 are on the inside, where they cannot be touched by people and objects bearing static charges. The internal semiconductor circuits are thereby protected from static destruction.

The ability of the card to fold in a particular direction increases its capability to withstand external forces applied in that direction, thereby improving the reliability of the card in comparison with the prior art card.

The invention is not limited to the IC card of the embodiment described above but can be applied to any thin semiconductor card, and the size of the card is not limited to the international standard for IC cards.

The configuration and materials of the deformable hinging part are not limited to the polymer rubber mentioned in the above embodiment, nor are there restrictions on the placement of or number of deformable hinge parts. The card may have two or more hinging parts so that the card is folded into three, four or a larger number.

Figure 3A:
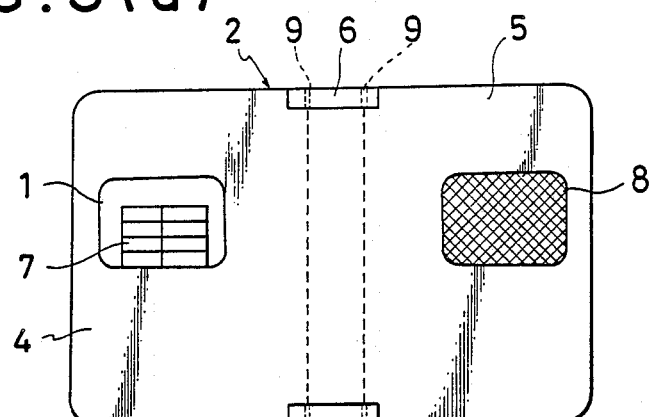
FIG. 3(a) is a plan view showing a thin semiconductor card of another embodiment.
Figure 3B:
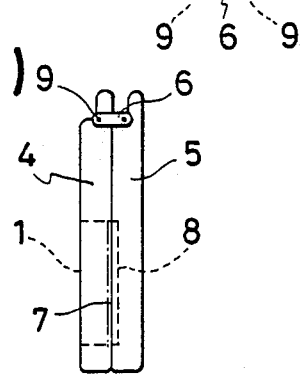
FIG. 3(b) is a side view showing the thin semiconductor card of FIG. 3(a) as folded.
Figure 3C:
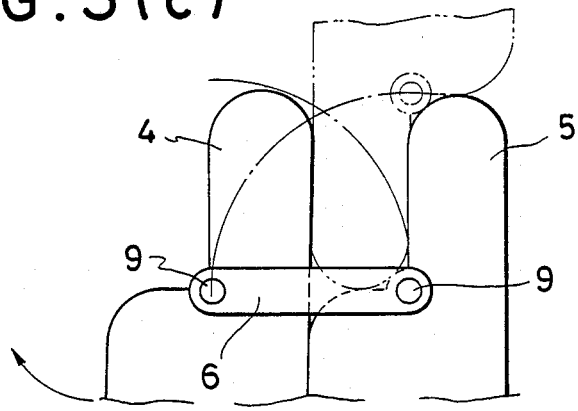
FIG. 3(c) is an enlarged view showing the deformable portion of the thin semiconductor card of FIG. 3(a) and FIGS. 4(a) and 4(b) are a plan view and a side view showing a conventional thin semiconductor card.

FIG. 3 shows another embodiment of the invention. In contrast to the embodiment of FIG. 1, in which a deformable part is provided in a part of the card main body, the card of the embodiment of FIG. 3 has a structure comprising two separate halves. In all, the card main body 2 comprises three parts: a first half 4 containing a semiconductor module 1, a second half 5 not containing such a module, and linkage member 6 between the two halves 4 and 5. The halves 4 and 5 can be made from, for example, a poly-vinyl chloride (PVC). The two halves rotate around pins 9.

This card can be used in the same way as described above with reference to the embodiment of FIG. 1; that is, opened for use as in FIG. 3 (a) and closed for carrying as in FIG. 3 (b). FIG. 3 (c) shows a detailed view of the vicinity of the linkage member 6. The solid lines show the folded configuration, and the phantom lines represent the card in the opened position.

The embodiment shown in FIG. 3 is also provided with a measure for preventing so-called "soft errors" resulting from static charges. The half 5 not containing the semiconductor module is provided, at a certain part thereof, with a conductive coating 8 consisting, for example of a conductive plastic. The conductive coating 8 is located so as to touch all of the electrode contacts 7 when the card is closed for carrying, thereby bringing all contacts to the same electrical potential.

This embodiment of the present invention has an additional advantages in that it has a higher reliability due to enhanced protection against static destruction.

The linkage member 6 depicted in FIG. 3 are shown as an example, not implying any limitation regarding the materials or configuration of the linkage. The substance of the conductive coating is similarly not limited, nor is the method of equalizing the potential of the contacts restricted to that used in this embodiment. For example, in place of the conductive coating a separate conductive material may be mounted or bonded on the card.

In summary, a thin semiconductor card embodying this invention has a foldable structure that is convenient for carrying and affords protection against damage to the internal semiconductor components, in that the electrode contacts are concealed inside when the card is folded. In addition, this invention enables further improvement in reliability to be attained by means of a conductive substance provided on the card in such a location as to touch the electrode contact surfaces. A further advantage of this folding card structure is the protection it offers against damage resulting from mechanical force applied in the folding direction.

What is claimed is:

1. An integrated circuit card comprising:
   an integrated circuit card main body;
   a semiconductor module mounted in said integrated circuit card main body;
   folding means permitting said integrated circuit card main body to be folded shut;
   electrode contacts on a first section of a first surface of said integrated circuit card main body which comes inside when said integrated circuit card main body is shut; and
   a conductive substance disposed on a second section of the first surface of said integrated circuit card main body to be in contact simultaneously with all of said electrode contacts when said integrated circuit card main body is folded shut.

2. The integrated circuit card of claim 1 wherein said folding means comprises deformable means formed of part of said card main body.

3. The integrated circuit card of claim 1 wherein said folding means comprises a separate linkage means linking said sections in such a manner that said sections can be turned relative to each other.

4. The integrated circuit card of claim 1, wherein said electrode contacts are disposed for connection of said semiconductor module with external devices.

5. A thin semiconductor card comprising:
   a card main body
   a semiconductor module mounted in said card main body,
   folding means permitting said card main body to be folded,
   electrode contacts on a first section of a first surface of said card main body which comes inside when said card main body is closed, and
   a conductive substance disposed on a second second of the first surface of said card main body to be in contact simultaneously with all of said electrode contacts when said card main body is folded shut.

6. The thin semiconductor card of claim 5, wherein said conductive substance is a conductive coating applied to part of said card main body.

* * * * *